March 11, 1924.
R. A. SMITH
CONNECTING ROD BEARING
Filed June 4, 1923
1,486,465
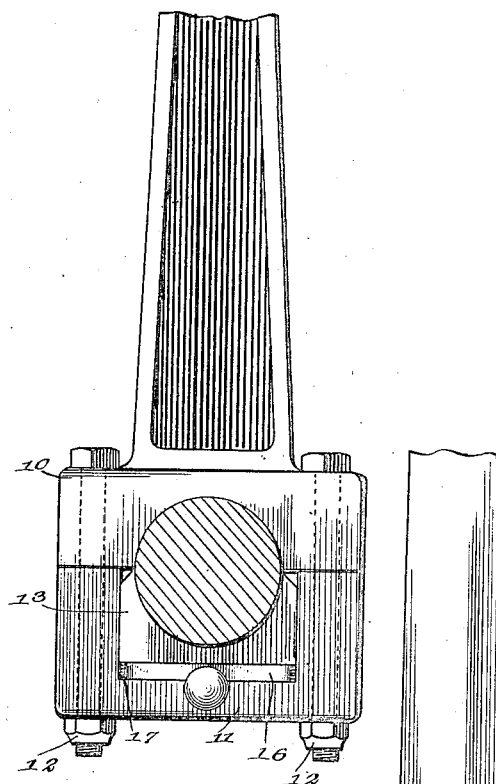
Fig. 1.
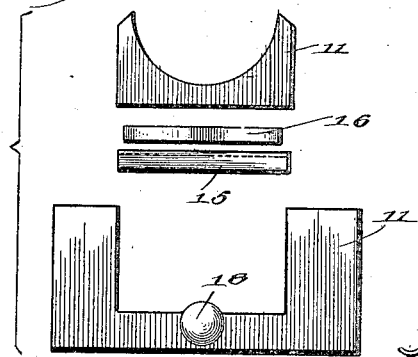
Fig. 3.
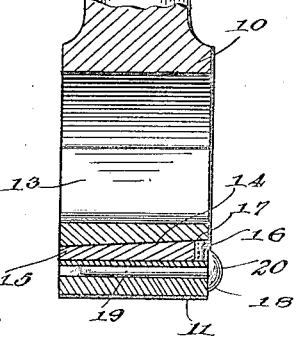
Fig. 2.
Fig. 4.
WITNESSES
INVENTOR
R. A. Smith,
BY
ATTORNEYS Patented Mar. 11, 1924.

1,486,465

UNITED STATES PATENT OFFICE.

RONALD ALYMER SMITH, OF MOUNT PLEASANT, PENNSYLVANIA.

CONNECTING-ROD BEARING.

Application filed June 4, 1923. Serial No. 643,377.

*To all whom it may concern:*

Be it known that I, RONALD ALYMER SMITH, a citizen of the United States, and a resident of Mount Pleasant, in the county of Westmoreland and State of Pennsylvania, have invented certain new and useful Improvements in Connecting-Rod Bearings, of which the following is a specification.

This invention relates to an improvement in connecting rod bearings, and has for its object to provide a bearing of this character which properly engages the elements journaled therein at all times and which automatically takes up or compensates for wear, the bearing at the same time being of simple and durable construction and having the parts thereof which engage the journal rigidly and firmly supported.

Another object is to provide a device of this character and having the foregoing advantages and which at the same time is susceptible of comparatively inexpensive manufacture from materials and by means of facilities ordinarily available, the bearing being readily assembled and being so organized that it may be readily taken apart for purposes of replacement and repair.

Other objects and advantages of the invention reside in certain novel features of the construction, combination and arrangement of parts which will be hereinafter more fully described and particularly pointed out in the appended claim, reference being had to the accompanying drawings forming part of this specification, and in which:

Figure 1 is a fragmentary view in elevation, showing a cross rod bearing constructed in accordance with the present invention;

Figure 2 is a view thereof, partly in elevation and partly in longitudinal section, the journal or part mounted in the bearing being omitted;

Figure 3 is a group view in elevation, showing the cap, the movable bearing block and associated parts prior to assembly; and Figure 4 is a detail view in plan of the bowed spring employed.

Referring to the drawings wherein for the sake of illustration is shown the preferred embodiment of the invention, the numeral 10 designates the fixed bearing block of the connecting rod bearing to which a U-shaped cap 11 is secured by bolts and nuts 12. A movable bearing block 13 is slidably fitted within the cap and coacts with and supplements the action of the fixed bearing block 10 in providing a bearing for the journal of the part or machine element mounted in the bearing. As clearly shown in Figure 2 the under side of the movable bearing block 13 is inclined as at 14. A wedge 15 is interposed between the movable bearing block 13 and the cap 11 and engages the inclined under face 14 of the movable block as well as the body portion of the cap 11. As shown in Figure 2 the arrangement is such that when the wedge 14 is moved transversely of the cross head bearing that is to the left as viewed in Figure 2, the movable bearing block 13 will be advanced or moved toward the fixed bearing block 10 and spring means is provided which tends to so move the wedge 15. Preferably this spring means comprises a spring 16 which is constructed of a single piece of resilient or spring metal bowed intermediate its ends and having extremities or terminals 16ª reversely curved with respect to the body of the spring, as shown in detail in Figure 1. As shown in Figures 1 and 2 the wedge 14 is somewhat smaller than the extent of the movable bearing block from the front to the back thereof, and this arrangement provides a space or channel 17 into which the spring 16 is fitted, the curved ends 16ª of the spring engaging the wedge adjacent each side thereof. An abutment 18 is provided for engaging the bowed central portion of the spring, and preferably this abutment consists of a pin 19 having a head 20 which engages the spring, the pin 19 being embedded or received in the opening provided therefor in the cap 11 and being suitably held in the opening. Various expedients may be resorted to for securing the pin 19 in the opening. For instance, its end opposite the head 20 may be swaged over and engaged with the lower part of the cap 19 or such end may be split and spread after the pin is positioned, the opening which receives the pin being slightly enlarged at the split end of the pin.

In use the spring 16 urges the wedge 15 to such position as to properly dispose the bearing block 13 so that this bearing block will engage its journal and afford an efficient and complete bearing therefor. It is to be noted that the positive structure of the wedge resists any tendency of the block 13 to move away from its journal and that the spring 16 is not subjected to any strains that might be set up by forces exerted on the bearing block 13 tending to move the same away from its journal, such forces resulting in bringing strains in the wedge 15 which the wedge 15 is well adapted to withstand. On the other hand the spring 16 is always active to urge the wedge to such position as to move the block 13 to take up wear or the like. Again the spring 16 is housed and protected and is subjected to a minimum of strains and forces while being well adapted to carry out its functions.

I claim:

A connecting rod bearing having a fixed bearing block, a cap secured thereto, a movable bearing block arranged within the cap and having its underface inclined, a wedge fitted in between the inclined under face of the bearing block and the adjacent portion of the cap, a bowed spring having its ends engaging the wedge, and an abutment for the intermediate portion of said spring carried by said cap.

RONALD ALYMER SMITH.